No. 642,950. Patented Feb. 6, 1900.
L. C. BALDWIN.
APPARATUS FOR CEMENTING DENTS IN REED RIBS.
(Application filed Sept. 15, 1897.)
(No Model.)
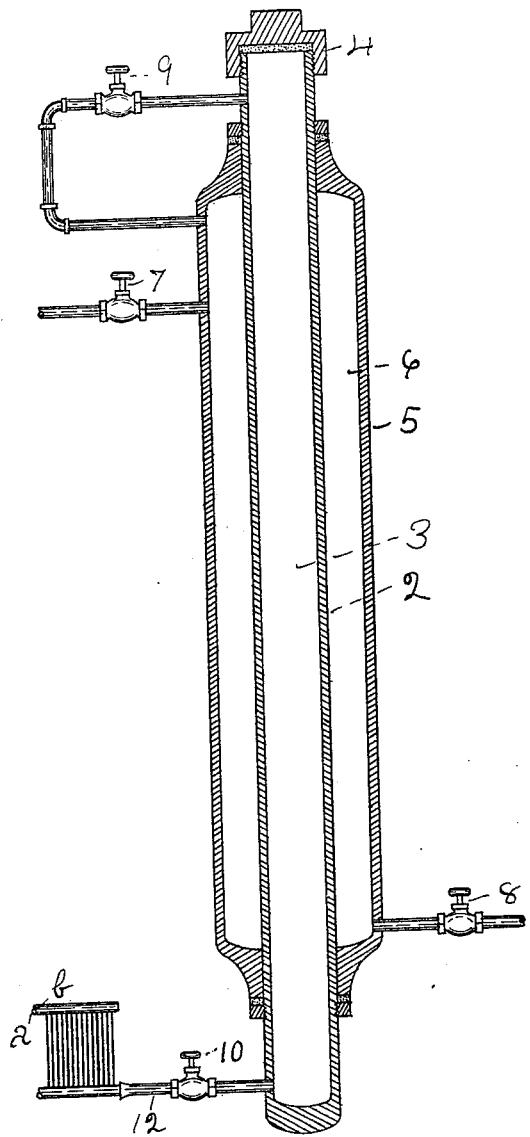
WITNESSES
Maude M. Tuttle.
A. M. Tuttle
INVENTOR
Luther C. Baldwin
By C. B. Tuttle
His Atty.

UNITED STATES PATENT OFFICE.

LUTHER C. BALDWIN, OF MANCHESTER, NEW HAMPSHIRE.

APPARATUS FOR CEMENTING DENTS IN REED-RIBS.

SPECIFICATION forming part of Letters Patent No. 642,950, dated February 6, 1900.

Application filed September 15, 1897. Serial No. 651,733. (No model.)

*To all whom it may concern:*

Be it known that I, LUTHER C. BALDWIN, of Manchester, State of New Hampshire, have invented certain Improvements in Apparatus for Cementing Dents in Reed-Ribs, of which the following, read in connection with the accompanying drawing, is a specification.

The invention has for its object an apparatus for use in cementing dents in reed-ribs, whereby the cement shall be introduced into the chamber of the reed-rib and thoroughly intermingled with the dents and made to fill the spaces therebetween in a compact mass, touching and sustaining each and every dent.
The invention consists in the matters hereinafter described, and referred to in the appended claims.

The accompanying drawing shows in sectional elevation the apparatus I have employed in carrying out this invention as it is shown in the present instance.

This apparatus comprises a tank 2, having the chamber 3, into which the cement material is introduced through a suitable opening covered by the cap 4. Outside of the tank 2 is a jacket 5, having steam-chamber 6. At the top of chamber 6 is an inlet controlled by stop-cock 7, wherethrough steam from any suitable source may be introduced to the chamber 6 and therein allowed to circulate about and heat to a molten state the cement material located in the tank 2. At the bottom of chamber 6 is an outlet suitably controlled by stop-cock 8 for withdrawing the liquid of steam condensed in the chamber 6. At or near the top end of tank 2 is a connection suitably controlled by stop-cock 9, wherethrough steam is introducable from the chamber 6 into the chamber of tank 2 for acting upon the top of the molten mass of cement. At the bottom of tank 2 is a connection suitably controlled by stop-cock 10, wherethrough the molten cement in conducted into the chamber of a reed-rib suitably placed at the open end thereof.

It will be understood that the reed-rib is formed of parts *a b*, which are concaved or suitably hollowed, whereby when placed together is formed a chamber extending from end to end thereof. The dents being placed therebetween are spaced and wound with twine material, all this in the customary and well known manner. The reed-rib is then pressed tightly against the connection 12, its chamber being suitably in communication with the conduit of said connection 12. The cock 10 is operated to open the conduit, whereupon the cement by reason of the pressure developed from the steam acting upon the molten mass above moves rapidly along into and through the chamber of the reed-rib while in the superheated, and consequently liquefied, state, which insures the complete filling of the reed-rib chamber and all spaces intermediate the dents, after which the reed-rib is removed and the cement is allowed to set and harden by cooling.

I use cement of pitch and tar in the ordinary proportions, but other cement materials may be employed, if desired.

It should be observed that the steam introduced to the chamber or tank 2 should be dry, so as not to undesirably intermix with the cement material by condensing therein. For this reason I have placed the inlet on top of chamber 6 and provided exhaust for condensed steam through stop-cock 8, whereby the dryness of the steam is suitably maintained at all times.

The pressure of the steam from above upon the molten mass of cement may be varied to a degree; but to insure rapid flow of the molten cement through the reed-rib chamber without liability of the cement becoming unduly hardened by cooling and also to insure the desired pressure thereof at all places I have found it preferable to use a steam-pressure of sixty-five pounds and upward.

Instead of the dry steam being employed as I have herein described it may be employed in other forms of apparatus suitably adapted therefor, and obviously, too, other means of steam or air or any suitable agent may be employed to develop the required pressure. I do not therefore limit myself; but

I claim—

1. An apparatus of the nature indicated, comprising a receptacle for the cementing agent and provided with a seat upon which the end of the reed-rib frame rests, an outlet from said receptacle opening through said seat and means for forcing the cementing agent from the receptacle through the seat into the tubes of the reed-rib frame; substantially as described.

2. An apparatus of the nature indicated, comprising a receptacle for the cementing agent and provided with a seat formed to support and close the ends of the reed-rib frame, an outlet from said receptacle opening through said seat, and means for forcing the cementing agent from the receptacle through the seat into the tubes of the reed-rib frame; substantially as described.

3. An apparatus of the nature indicated comprising a receptacle for a cementing agent, and provided with a seat upon which the end of the reed-rib frame rests, a casing in proximity to said receptacle whereby a chamber is formed between the wall of the casing and the wall of the receptacle, an outlet from said receptacle, an inlet for a fluid under pressure into the chamber, and a passage between the chamber and the receptacle; substantially as described.

4. An apparatus of the nature indicated comprising a receptacle for a cementing agent, a casing surrounding said receptacle whereby a chamber is formed between the wall of the casing and the wall of the receptacle, an outlet from said receptacle, an inlet for a fluid under pressure into the chamber, and a passage between the chamber and the receptacle, said receptacle having a seat as 12; substantially as described.

Signed at Manchester, New Hampshire, this 2d day of September, A. D. 1897.

LUTHER C. BALDWIN.

Witnesses:
ARTHUR A. HALE,
FRANK E. ANDREWS.